Figure 1:
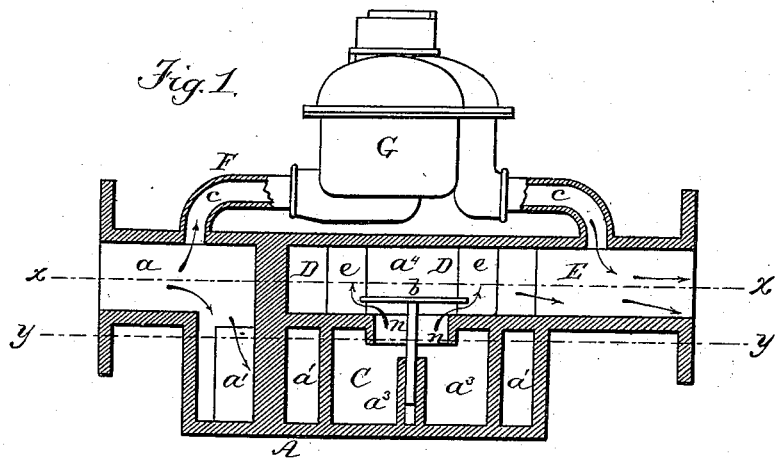

(No Model.)

L. H. NASH.
PROPORTIONAL WATER METER.

No. 332,935. Patented Dec. 22, 1885.

Attest:
R. E. Grant
F. O. Morris

Inventor:
Lewis Hallock Nash
by his Attorneys
Johnson and Johnson

UNITED STATES PATENT OFFICE.

LEWIS HALLOCK NASH, OF BROOKLYN, ASSIGNOR TO THE NATIONAL METER COMPANY, OF NEW YORK, N. Y.

PROPORTIONAL WATER-METER.

SPECIFICATION forming part of Letters Patent No. 332,935, dated December 22, 1885.

Application filed April 17, 1885. Serial No. 162,588. (No model.)

*To all whom it may concern:*

Be it known that I, LEWIS HALLOCK NASH, a citizen of the United States, residing at Brooklyn, in the county of Kings and State of New York, have invented new and useful Improvements in Proportional Water-Meters, of which the following is a specification.

This invention relates to devices for measuring water flowing through a pipe in which the volume is divided at the inlet into two streams, one of which only passes through the chamber containing the working and registering mechanism in such determined relation to the other stream as to represent a given and definite proportion of the entire volume, and the indicator should show the measurement of the whole passing volume.

In the organization of my improved meter my object is to equalize the resistance to the flow of the divided streams by a device of simple and compact construction, embracing, as co-operating elements, a receiving-chamber for the non-metered stream having separate current, diverting and retarding concentric passages communicating with the discharge by a valved port, a supplemental chamber containing abutments placed in radial relation to each other, communicating with the valved port and with the discharge, and a measuring device communicating with the influent passage of the main chamber and with the effluent passage of the supplemental chamber, whereby to produce a resistance to the flow in the communicating chambers in proportion to the amount of the flow, and to overcome by the function of the valve the resistance due to the friction of the moving parts of the measure-indicating devices under small velocities of flow.

The advantages of the circular form of the chamber-passages are that it gives a tangential inlet to the receiving-chamber, and thereby a circular direction to the inflow, an increased surface-resistance to the flow through the non-metered chamber, and a radial outlet to discharging-chamber.

The advantages of measuring a part only of the whole volume passing through a meter to give the sum of the whole volume are that it admits of the use of more sensitive measuring mechanism, effects a more accurate measurement, and permits the use of a comparatively small meter for a large supply of water to the service-pipe.

I do not claim, broadly, a retarding-passage in a water-main, nor the combination of current diverting and retarding passages in the main with a measuring device operated by a division of the inflow volume.

The accompanying drawings illustrate my said water-measuring device as applied to the indicating device known as a "meter," in which—

Figure 2:
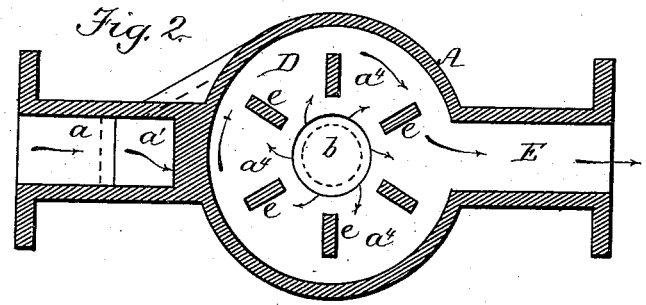
Figure 3:
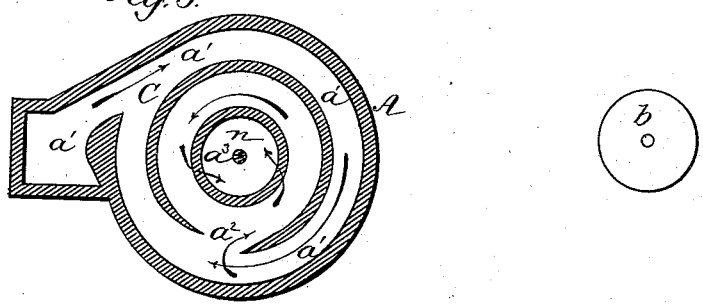

Figure 1 represents a vertical longitudinal section, the working device being seen in elevation; Fig. 2, a horizontal section taken on the line $x$ $x$ of Fig. 1, showing the mechanical obstructions in the discharge-communicating passage; Fig. 3, a similar section taken on the line $y$ $y$ of Fig. 1, showing the series of current-diverting passages communicating with the inlet.

My improved measuring device is not confined in its application to any particular construction of working devices for operating the indicator mechanism, which is arranged in what is known as the "meter," the inclosing-case G of which I have shown in elevation as connecting with the inferential current.

The measuring device proper consists of a shell, A, formed like pipe-fittings, independent of the meter-case G, and divided into two passages or chambers, C and D, which communicate with each other by a central valved opening, $n$, which forms the discharge from the receiving current-diverting passages. The inlet-passage $a$ and the outlet-passage E are preferably of equal area, and the former communicates with the working-chamber of the indicator device by a pipe, F, and with the series of current-diverting passages having a valved outlet, whereby the volume of the inflow is divided at the inlet. The metered passage $c$ communicates with the passage E at a point outside of the mechanical obstructions of the chamber D, so that the flow from the meter G to the service-pipe will be unaffected by the retarding action of the current in the chamber.

The current-diverting passages in the example shown are of circular form, and consist of one or more separate passages, $a'$, leading from the inlet-passage $a$ into a central chamber, $a^3$, by a side opening, $a^2$, the said chamber, by a central valved opening, communicating with the upper chamber, D, wherein is placed a series of impediments or abutments, $e$, arranged to allow the current to flow between and around them direct to the outlet-passage. The valve $b$ is a disk placed in the upper chamber, D, and tends to close by its weight over the port $n$, and it is maintained in position by a stem seated in a guide rising from the bottom of the chamber $a^3$, and the function of this valve I will explain presently.

The water flowing into the passage $a$ is divided into separate streams, each flowing through separate passages, as stated. By the laws of the flow of water the quantity that will flow through these separate passages will be inversely proportional to the resistance offered to its movement, and these resistances increase as the square of the velocity of the currents. Now, the water passing through the passage $c$ and the meter G will encounter a certain resistance to its flow, depending on the dimensions and shape of the passage and of the meter used.

In order that the flow in the main passages $a'$ $a^3$ $a^4$ shall have a proportionate resistance, it is necessary to provide for as great resistance to the flow therein as is offered to the flow through the meter; and for this purpose I provide the series of current-diverting channels and impediments adapted to offer the required amount of frictional resistance to the passage of the water. In this provision of equalizing the resistance to the flow of the separate currents it is not important as to the shape or construction.

Besides the resistance in the meter due to the hydraulic friction of the flowing streams, there is also a resistance due to the moving parts of the measure-indicating devices. To provide for this I introduce the weighted valve $b$, which tends to close some portion of the main passage, as at $n$, the weight of the valve being just enough to counterbalance the friction of the indicator-working parts referred to under the small velocities of flow.

It is obvious that I may use more than one chamber, constructed, like chamber C, of many passages, and connect them, so that the flow will be direct therefrom into the chamber D, and I may construct the latter like chamber C.

I claim—

1. The combination of a water-measuring device, G, with a chamber-section of the water-main having one or more circular passages, $a'$, in the same plane, a tangential inlet, and a valved port, $n$, arranged between the influent and the effluent passages of said chamber-section, substantially as described, for the purpose specified.

2. The combination of a water-measuring device, G, with a chamber-section of the water-main having one or more communicating circular passages, $a'$, in the same plane, supplemented by a chamber, $a^4$, having radial abutments $e$, and communicating with said circular passages, substantially as described, for the purpose specified.

3. The combination, in a water-meter, of a shell having a receiving and discharging chamber formed with current diverting and retarding passages, with a valved communicating opening and a metered passage communicating with the discharge-chamber outside of the current-retarding passages, substantially as described, for the purpose specified.

4. The combination, in a water-meter, of a shell having the obstructed passages $a'$ $a^2$ $a^3$ $a^4$, with the communicating port $n$ and a metered passage, $c$, which receives a division of the volume to be measured, substantially as described, for the purpose specified.

5. In a water-meter, the combination, with the working and registering device receiving a division of the volume to be measured, of a main chamber adapted to resist the flow of water, a weighted valve for the communicating port of said passages arranged and operating to balance the friction due to the moving parts of the measure-indicating devices, and means, substantially such as described, for equalizing the resistance to the flow of the divided volume.

6. The water-meter-chamber section A, consisting of two chambers, one supplementing the other and communicating centrally, one chamber having circular passages in the same plane and the other chamber having separated abutments, the receiving-chamber having a tangential inlet and the discharging-chamber a radial outlet, in combination with a measuring device operated by the division of the inflow volume, substantially as herein set forth.

In testimony whereof I have hereunto set my hand in the presence of two subscribing witnesses.

LEWIS HALLOCK NASH.

Witnesses:
H. W. BRINCKERHOFF,
WILLIAM C. WESTERVELT.